United States Patent

[11] 3,618,976

| [72] | Inventors | Maurice B. Leising<br>Clawson;<br>Douglas A. Larson, Sterling Heights; John<br>M. Stilson, Troy, all of Mich. |
|---|---|---|
| [21] | Appl. No. | 870,343 |
| [22] | Filed | Oct. 31, 1969 |
| [45] | Patented | Nov. 9, 1971 |
| [73] | Assignee | Chrysler Corporation<br>Highland Park, Mich. |

[54] INFLATABLE BAG AND GAS DIFFUSING DEVICE
10 Claims, 6 Drawing Figs.

[52] U.S. Cl. .................................................... 280/150AB,
23/281, 55/455, 102/39
[51] Int. Cl. ..................................................... B60r 21/08
[50] Field of Search ........................................... 280/150
AB; 23/281; 55/302; 102/39; 9/2 A, 11 A, 321

[56] References Cited
UNITED STATES PATENTS

| 2,850,291 | 9/1958 | Ziccardi | 280/150 AB |
|---|---|---|---|
| 2,985,104 | 5/1961 | Fox | 102/39 |
| 3,066,014 | 11/1962 | White et al. | 23/281 |
| 3,167,415 | 1/1965 | Edwards | 55/302 |
| 3,336,045 | 8/1967 | Kobori | 280/150 AB |
| 3,473,824 | 10/1969 | Carey et al. | 280/150 AB |
| 3,532,359 | 10/1970 | Teague et al. | 280/150 AB |
| 3,532,360 | 10/1970 | Leising et al. | 280/150 AB |

Primary Examiner—Benjamin Hersh
Assistant Examiner—John A. Pekar
Attorney—Harness, Talburtt and Baldwin ABSTRACT: Inflatable bag device including a gas generator containing ignitable propellant, a bag adapted to be inflated by the gas released from the propellant, and an expansible chamber which filters and diffuses the gas and propellant particles discharged from the gas generator.

PATENTED NOV 9 1971

INVENTORS.
Maurice B. Leising
Douglas A. Larson
John M. Stilson
BY
Harness, Talburtt & Baldwin,
ATTORNEYS

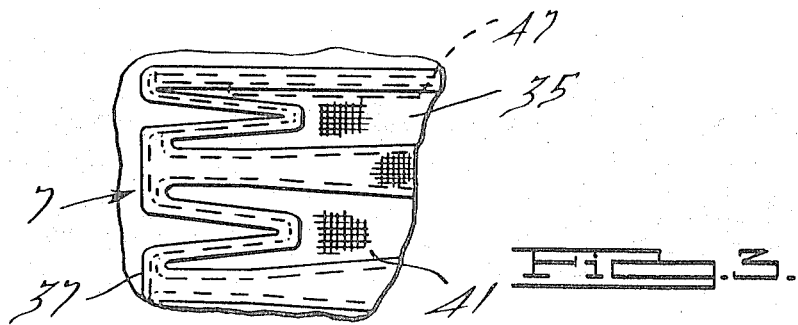
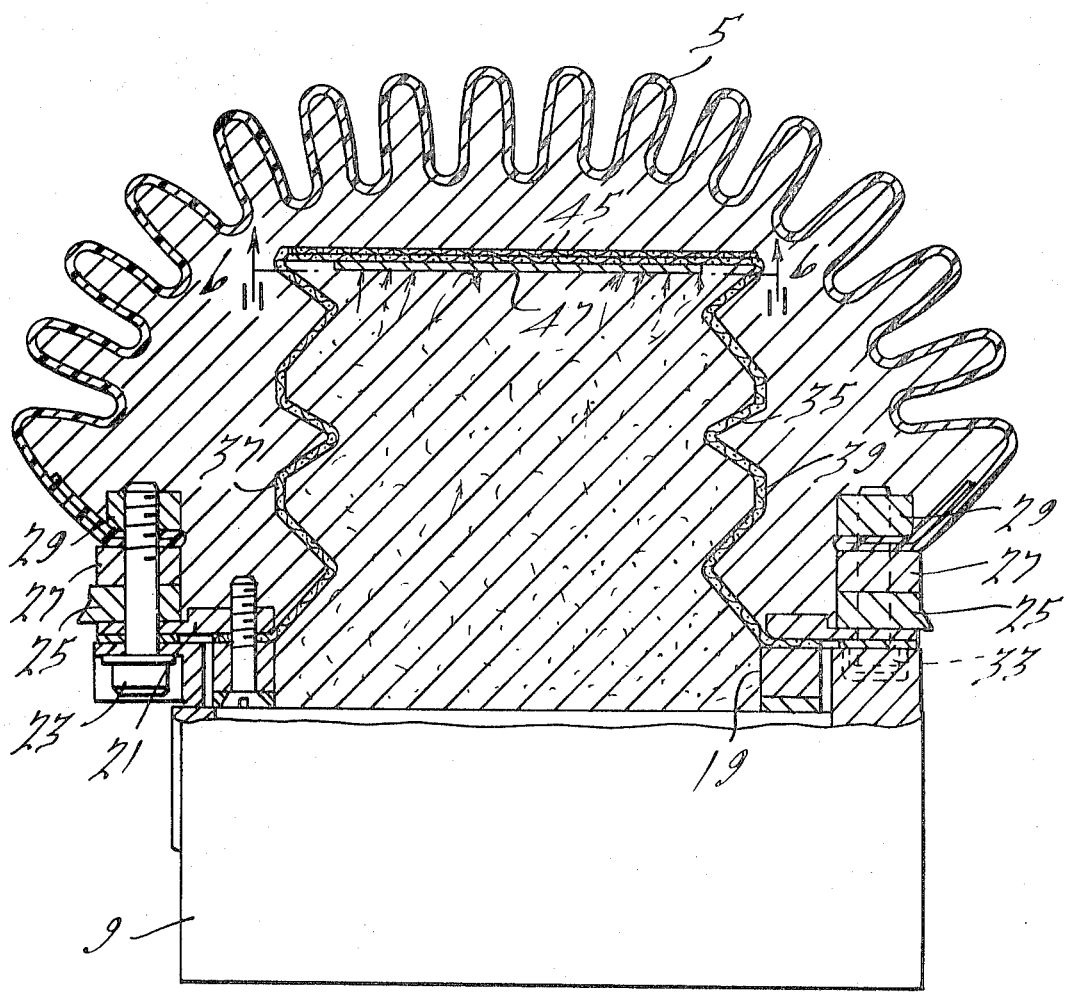

PATENTED NOV 9 1971

INVENTORS.
Maurice B. Leising
Douglas A. Larson
John M. Stitson
BY
Harness, Talburtt & Baldwin,
ATTORNEYS

INFLATABLE BAG AND GAS DIFFUSING DEVICE

BACKGROUND OF THE INVENTION

This invention relates to a gas releasing and inflatable bag device, particularly adapted for use in automotive vehicles, and more particularly to a device for diffusing and filtering the products emanating from the gas generator.

Many types of gas source or generator and inflatable bag devices particularly adapted for use in automotive vehicles are known. For example, some of these devices employ a sealed cylinder of compressed gas connected directly or by a conduit to an inflatable bag mounted on the interior of the vehicle. A sensing device is conventionally provided for sensing rapid deceleration or change in velocity of the vehicle. Upon a predetermined change in vehicle velocity, such as upon impact with another object, the sensing device causes a signal to be sent to an actuating device for breaking the seal on the cylinder to release the gas to the bag. The latter inflates and provides a cushion against which an occupant may be thrown by the impact.

Another type of generator comprises a housing holding a supply of propellant adapted to be ignited in response to a signal indicative of a collision of predetermined magnitude. The burning propellant releases gas to expand the inflatable bag. A device of this general type is disclosed in copending U.S. Pat. application, Ser. No. 746,333, filed July 22, 1968 now U.S. Pat. 3,532,358 issued Oct. 6, 1970.

The propellant must burn to release the inflating gas, and it is highly desirable to keep the burning propellant from direct contact with the bag being inflated. Moreover, if the bag should rupture, it is desirable that the occupant not be directly subjected to the hot particles or masses of propellant. The present invention is directed toward a device for inhibiting such occurrences.

SUMMARY OF THE INVENTION

Briefly, this invention comprises a gas generator, an inflatable bag and a filter to permit only gas and particles or materials below a predetermined size to pass from the generator to the interior of the bag and outside the filter.

One of the primary objects of this invention is to provide a device for preventing large particles emanating from a gas generator from entering a bag inflated by the gas produced by the combustion of the propellant.

Another object of this invention is to provide a device such as described which inhibits combustion products from passing directly from the gas generator to the bag walls.

A further object of this invention is to provide a device of the type described which diffuses and distributes high-velocity gases in the bag.

Still another object of this invention is to provide a device of the class described which forms an initial pressure chamber and which aids in deployment of the bag.

A further object of this invention is to provide a device such as described which is adapted to absorb heat from the hot gases.

Another object of this invention is to provide a device of the type described which is crushable and will collapse if subjected to a slight load.

Another object of this invention is to provide a device such as described which provides a combustion chamber for the propellant, or if a coolant material, such as described in copending application, Ser. No. 746,560, filed July 22, 1968, now U.S. Pat. No. 3,532,399 is utilized, provides a combustion and mixing chamber for the propellant and coolant.

A further object of this invention is to provide a device of this type which is economical in construction and reliable in operation.

Other objects and advantages of this invention will be made apparent as the description progresses.

BRIEF DESCRIPTION OF THE DRAWINGS

In the accompanying drawings in which one of several possible embodiments are shown.

FIG. 3 is an enlarged fragmentary view of FIG. 2;

FIG. 4 is a view generally similar to FIG. 1, showing the device during initial stages of inflation of the bag;

Like parts are indicated by corresponding reference characters throughout the several views of the drawings.

DESCRIPTION OF THE PREFERRED EMBODIMENT

Figure 1:
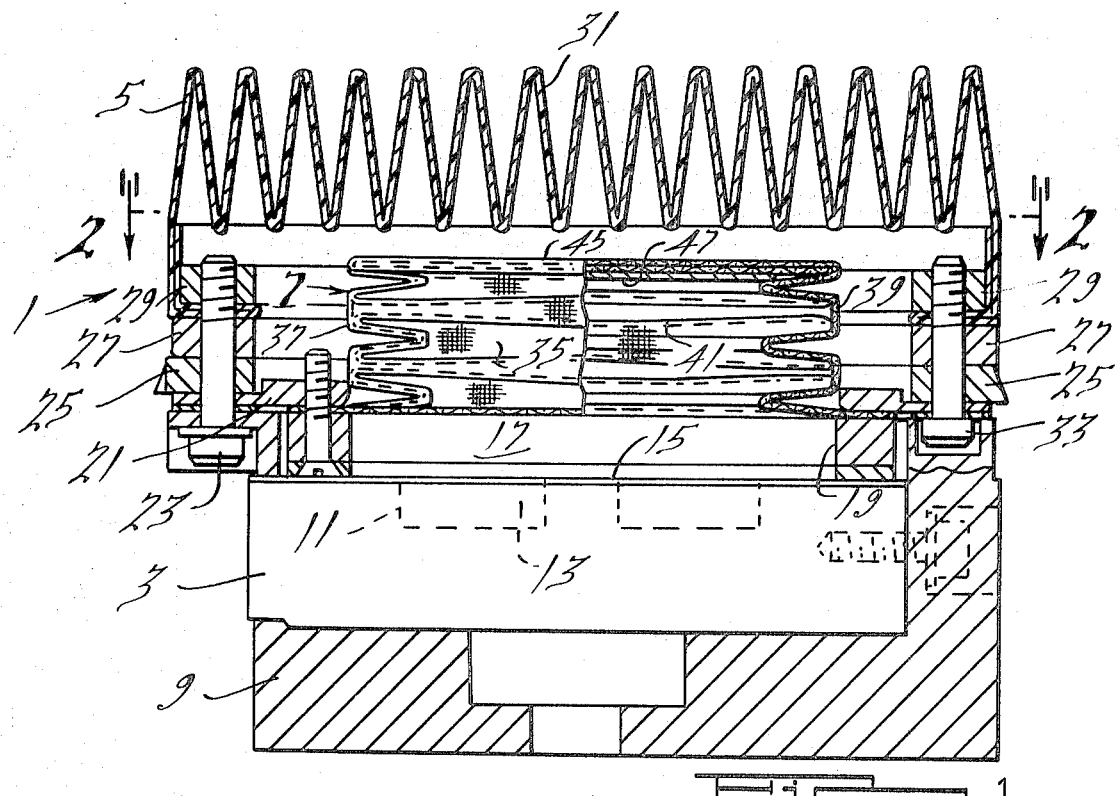
FIG. 1 is a side elevation, certain parts being shown in section, of a device constructed in accordance with this invention.
Figure 2:
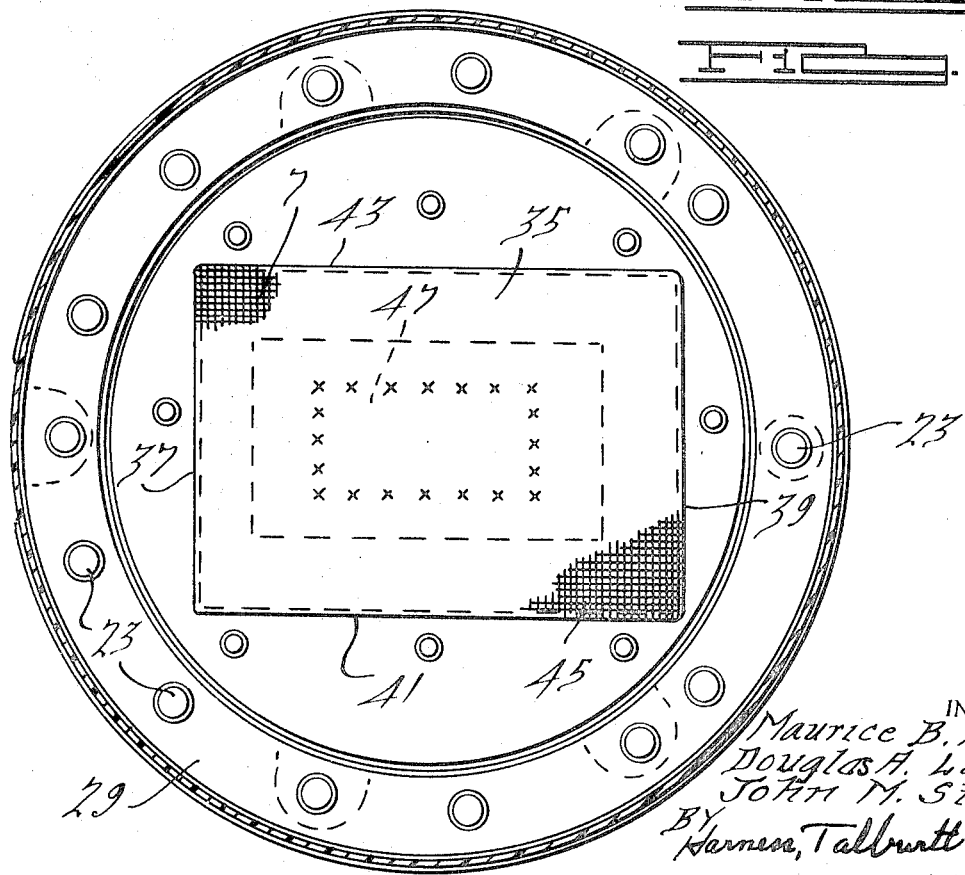
FIG. 2 is a view taken generally along line 2—2 of FIG. 1.

Referring now to the drawings, a gas generating and inflatable bag device is generally indicated at 1. The device basically includes a gas generating source or section 3, an inflatable bag or gas confining means 5 and a diffusing and filtering device or chamber 7 constructed in accordance with this invention.

More specifically, device 1 includes a housing 9 supporting generator 3. Generator 3 has one or more compartments 11 therein in which propellant 13 is stored. The generator thus constitutes an inflation means. Suitable ignition means (not shown) are provided for igniting the propellant in response to a signal from a sensor, indicative of a collision or deceleration of predetermined magnitude. A suitable rupturable membrane 15 extends across the generator outlet to retain the propellant in the generator until the propellant is ignited and sufficient pressure developed to rupture the membrane and be released. The propellant may be of a type disclosed in copending application, Ser. No. 746,333, i.e., back powder, which is adapted to ignite and be consumed by combustion within a few milliseconds, releasing gas in the process.

A body 17 having a generally rectangular passage 19 therethrough is adapted to be held in a position adjacent the generator 3 by an annular clamping plate 21 secured to housing 9 by fasteners 23 which extend through the housing 9, plate 21 and clamping rings 25, 27 and 29.

The inflatable bag 5 is folded in a manner to provide a plurality of folds 31 therein located side-by-side and extending generally away from the generator 3. The outer edges of the bag are folded double and secured to the periphery of the device between clamping rings 27 and 29. Fasteners 33 are provided in addition to fasteners 23 to increase the grip on bag 5.

The filtering device 7 comprises an expansible folded wire mesh screen 35. The screen 35 is shown to be generally in the shape of an inverted rectangular bottomed bag, two of the sides, 37 and 39 of which are provided with a plurality of elongated folds 39. The other two sides 41 and 43 are folded to accommodate the folds 39, i.e., the corners formed by the junction of the walls, are generally serpentine when viewed in a direction parallel to walls 37 and 39.

The lower edges of the walls 37, 39, 41 and 43 are clamped between plate 21 and body 17 around the periphery of the opening 19. A diffusing or deflecting plate 47 is secured to the bottom 45 of the bag shaped screen 35 for a purpose to be made apparent hereinafter. The screen 35 is expansible from the folded condition shown in FIG. 1 to the unfolded or extended position shown in FIG. 5. In its folded condition screen 35 is well within the confines of the folded bag 5. When expanded to its extended position, the screen is still well within the confines of the expanded gas filled bag.

Operation of the device of this invention is as follows:

Assuming the various parts are in the position shown in FIG. 1, the propellant 13 is initially ignited. Within a few milliseconds a pressure sufficient to rupture the membrane on diaphragm 15 is attained, and the diaphragm ruptures. The pressure of the gas released in the generator causes the burning propellant to be propelled or thrown outwardly through the passage 19 in body 15 into the chamber formed by the screen 35. The gas released by the burning propellant passes through the wire mesh screen and begins to inflate the bag. In addition, since the wire mesh offers some resistance to the flow of gas from the generator 3, the gas causes the pressure within the filter to rise, thus tending to inflate or expand the inverted bag shaped filter. A the filter beings to expand it may engage the inflatable bag and help deploy the latter.

As mentioned, the propellant is thrown or propelled out of the generator through the passage 19 into the chamber formed by the screen 35. A substantial portion of the propellant is consumed before it reaches the wire mesh of the screen or the deflection plate 47. This propellant merely releases gas which passes through the wire mesh or impinges on plate 47 and is deflected laterally through the wire mesh into the inflatable bag. However, some of the particles of propellant are not completely consumed by the time they reach the screen or deflection plate 47. If the burning particles were permitted to contact the inflatable bag walls they could have a deteriorating effect on the bag. If the particles are smaller than the mesh openings, any burning particles will be too small to cause significant deterioration of the bag walls, even if such particles are not consumed before they reach such walls. However, most particles will be completely consumed within a short distance from the screen. When particles which are larger than the mesh openings are propelled into the chamber, they are prevented by the filter from entering into the interior of the bag. The particles apparently either impinge upon deflection plate 47 and are diverted laterally to the screen walls or the particles impinge directly upon the screen walls. The large burning particles are prevented by the screen from passing therethrough until they are smaller then the openings therein. Also, as the large burning particles impinge upon the deflection plate 47 they are directed back toward the generator or toward the screen, where they continue to be consumed. In any event, the particles must be consumed to such an extent that they will not have a deleterious effect on the bag walls before they pass through the filter screen and impinge on the walls, and will not be large enough to create a hazard to an occupant if the bag should burst.

In addition to the deflection and filtering of hot and/or burning propellant particles, the plate 47 and the screen diffuse and distribute high-velocity gases in the bag. This is an important aspect of this invention and promotes rapid and even inflation of the bag. Moreover, the screen and plate absorb heat from the hot gases, thus aiding in the reduction of the temperatures to which the bag walls are subjected.

Figure 5:
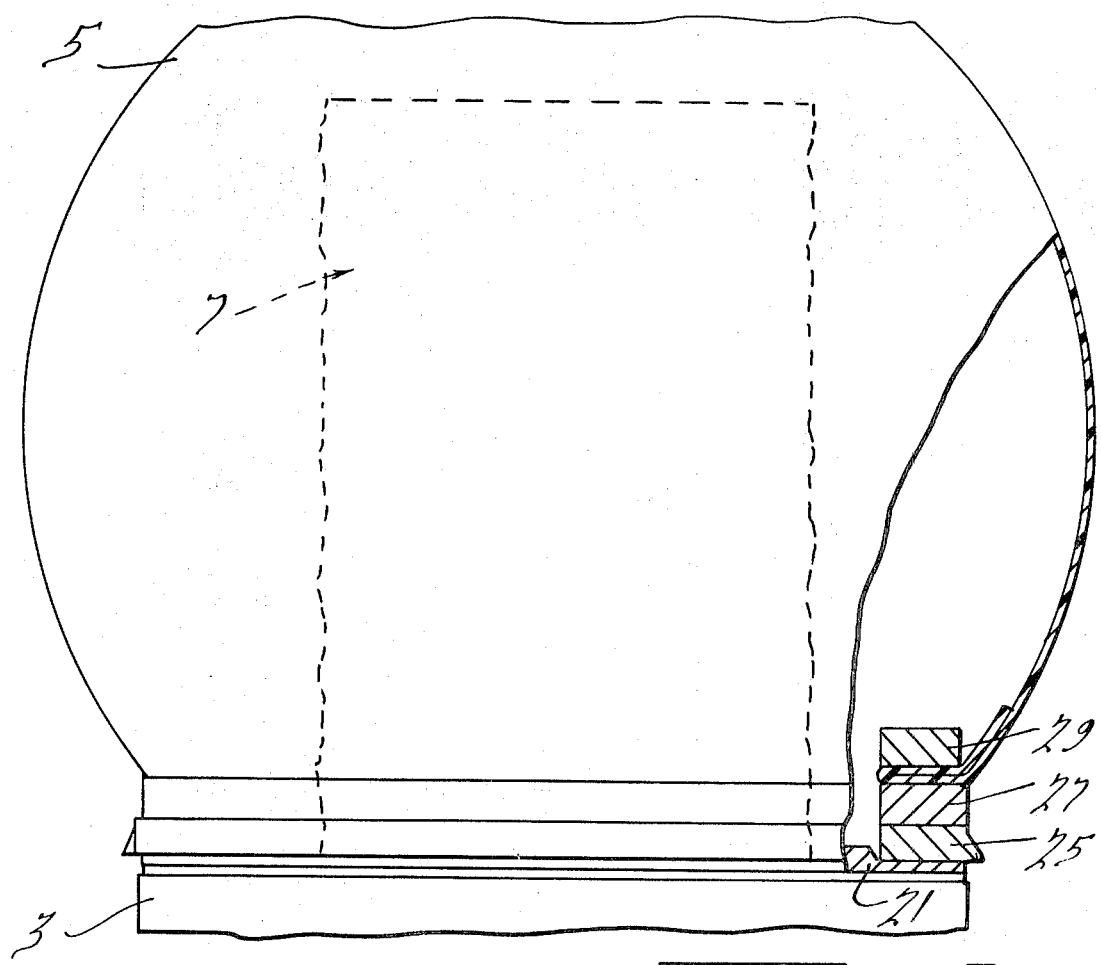
FIG. 5 is a view generally similar to FIG. 4, showing the device during final stages of inflation.
Figure 6:
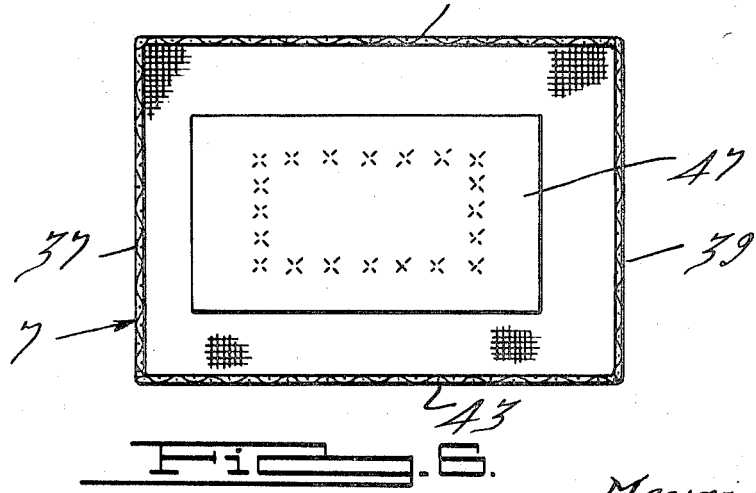
FIG. 6 is a sectional view taken generally along line 6—6 of FIG. 4.

When the bag is fully inflated, the filter 7 has itself been expanded or inflated to the position shown in FIG. 5. If the bag should be deflated beyond a predetermined amount, due to the impact of a vehicle passenger and the action of a pressure relief means, not shown, such as a relief valve or blowoff patch, for example, the erected filter 7 will readily collapse rather than remain rigid. The collapsing filter will, of course, absorb a small amount of energy during its collapse.

If desired, the passage 19 in body 17 may contain a supply of propellant coolant or other material such as described, for example, in aforementioned copending application, Ser. No. 746,560. Coolant is used to reduce the amount of heat to which the bag walls are subjected. When the propellant is thrown or propelled upwardly from generator 3, it passes through and is mixed with the coolant in passage 19 and both the propellant and coolant are discharged into the chamber formed by filter 7. The chamber acts as an initial, preliminary reacting, combustion and mixing chamber in which the propellant particles not only react, but also mix with the coolant in the event further mixing is desired.

While the filter 7 is shown in the form of an inverted rectangular bottomed bag member, it will be understood that other shapes could be employed. For example, it is contemplated that the bag could be in the general form of a cylindrical member, for example, folded or formed to simulate folds, along a plurality of spaced convolutions. As used herein fold means any construction which simulates a fold such as two flat members joined at their edges.

In addition to the advantage of providing increased filtering area when the device 7 expands from its normal position to its expanded position, the expansible device utilizes very little space in its normal condition and additionally permits a lighter weight material to be utilized than if the device were not expansible. The force exerted on the device 7 by the propellant and gas is relatively large, and if the device had to accomplish the filtering and diffusing objectively without expanding, the device would have to be constructed of considerably stronger material. If it were not, the various parts thereof might break apart and be propelled into the bag walls.

It will thus be seen that the filtering device of this invention aids in preventing hot or burning particles above a predetermined size from passing directly from the generator to the interior of the bag.

In view of the foregoing it will be seen that the several objects of this invention are achieved.

Although only one embodiment of the invention has been disclosed and described, it is apparent that other embodiments and modifications of the invention are possible.

We claim:

1. An inflatable device comprising an inflation means source, an inflatable means connected to said source, means for releasing said inflation means from said source for inflating said inflatable means, and moveable means in the path of said inflation means for altering the path of movement of a portion of said inflation means, said movable means comprising an expansible chamber, said chamber having at least one screen wall for filtering inflation means passing therethrough, said wall having at least one fold therein adapted to be unfolded to permit expansion of said chamber, said chamber expanding upon the ingress of said inflation means into said chamber.

2. In an inflatable bag device comprising a gas generator, an inflatable bag connected to said gas generator, the gas generator including propellant adapted to be ignited for releasing gas, a movable device comprising blocking means from inhibiting the movement of particles from said gas generator through said blocking means to the interior of said bag, and means for maintaining said blocking means in the path of particles and gases discharged from said generator, said blocking means comprising a filter device having a plurality of openings therein through which gas may pass, said filter device comprising an expansible hollow screen means.

3. In an inflatable device as set forth in claim 2 wherein said screen means has at least one sidewall and an end wall, said end wall closing said hollow screen member at one end thereof, said side wall having a plurality of folds therein.

4. In an inflatable device as set forth in claim 3 wherein said screen means has diffusing means therein for diffusing particles and gases impinging thereon.

5. An inflatable bag device comprising an inflatable bag, a gas generator having propellant therein, and an expansible chamber connected to said gas generator, said propellant being adapted to release gas and other products into said expansible chamber, said expansible chamber comprising a hollow screen body having at least one folded portion such that the introduction of gas and other products from said gas generator thereinto will cause said portion to unfold and said body to expand, said body when in an unfolded and expanded condition allowing gas to escape therefrom into said bag and preventing the escape of particles larger than the openings in said screen.

6. An inflatable bag device as set forth in claim 5 wherein said expansible chamber includes deflection means therein for deflecting gas impinging thereon.

7. An inflatable bag device as set forth in claim 5 wherein said expansible chamber includes means for diffusing said gas.

8. In an inflatable bag comprising a gas generator, an inflatable bag connected to said gas generator, the gas generator including propellant adapted to be ignited for releasing gas, expansible screen means for inhibiting the movement of particles from the gas generator through the screen means to the interior of the bag, said screen means comprising a body having at least one screen wall portion and one screen end portion, said screen wall portion having a plurality of folds therein prior to the release of gas into said body, said folds becoming unfolded as the gas released by said propellant passes into said body, said body expanding as said folds become unfolded, said body preventing the passage of particles larger than the openings therein through said screen wall and end into said inflatable bag.

9. In an inflatable bag device as set forth in claim 8, including a clamping plate extending around the periphery of said body at the end thereof adjacent said gas generator for clamping said body to said gas generator.

10. In an inflatable bag device as set forth in claim 9 further including means extending across said end portion of said body providing a barrier.

* * * * *